(12) United States Patent
Kim

(10) Patent No.: US 6,481,786 B1
(45) Date of Patent: Nov. 19, 2002

(54) STRUCTURE OF A COWL CROSS MEMBER MOUNTING UNIT

(75) Inventor: Jong Soo Kim, Ulsan (KR)

(73) Assignee: Hyundai Motor Company, Seoul (KR)

( * ) Notice: Subject to any disclaimer, the term of this patent is extended or adjusted under 35 U.S.C. 154(b) by 0 days.

(21) Appl. No.: 09/985,428

(22) Filed: Nov. 2, 2001

(30) Foreign Application Priority Data

May 11, 2001 (KR) .......................................... 01-25800

(51) Int. Cl.⁷ .................................................. B60J 7/00
(52) U.S. Cl. ...................... 296/203.02; 296/70; 180/90; 280/779
(58) Field of Search ........................... 296/203.02, 192, 296/194, 189, 70, 188, 72; 280/779, 752; 180/90

(56) References Cited

U.S. PATENT DOCUMENTS

| | | | | |
|---|---|---|---|---|
| 3,876,228 A | * | 4/1975 | Hawkins et al. ............... 296/70 |
| 4,362,319 A | * | 12/1982 | Masaki et al. ............... 280/779 |
| 4,432,565 A | * | 2/1984 | Suzuki et al. .................. 180/90 |
| 4,560,186 A | * | 12/1985 | Onitsuka et al. .............. 180/90 |
| 4,671,536 A | * | 6/1987 | Yoshimura .................. 280/779 |
| 4,709,943 A | * | 12/1987 | Yoshimura et al. ........... 180/90 |
| 4,826,234 A | * | 5/1989 | Komatsu .................... 280/779 |
| 4,909,566 A | * | 3/1990 | Hashimoto et al. ........... 296/70 |
| 5,052,742 A | * | 10/1991 | Akoshima et al. .......... 296/192 |
| 5,273,310 A | * | 12/1993 | Terai ............................ 296/70 |
| 5,387,023 A | * | 2/1995 | Deneau ....................... 296/72 |
| 5,431,442 A | * | 7/1995 | Tomita et al. ................. 180/90 |
| 5,482,319 A | * | 1/1996 | Yoshimura et al. ......... 280/752 |
| 5,564,769 A | * | 10/1996 | Deneau et al. ................ 180/90 |
| 5,707,100 A | * | 1/1998 | Suyama et al. ............... 180/90 |
| 5,868,426 A | * | 2/1999 | Edwards et al. ....... 296/203.02 |
| 5,992,925 A | * | 11/1999 | Alberici ................. 296/203.02 |
| 6,073,987 A | * | 6/2000 | Lindberg et al. .............. 296/70 |
| 6,315,347 B1 | * | 11/2001 | Gotz ..................... 296/203.02 |
| 6,322,124 B1 | * | 11/2001 | Kim ........................... 296/188 |
| 6,371,551 B1 | * | 4/2002 | Hedderly ..................... 296/70 |
| 6,378,934 B1 | * | 4/2002 | Palazzolo et al. ............ 296/208 |

* cited by examiner

*Primary Examiner*—Kiran Patel
(74) *Attorney, Agent, or Firm*—Birch, Stewart, Kolasch & Birch, LLP

(57) ABSTRACT

A cowl cross member mounting unit which includes a cowl cross member flange respectively joining both ends of a cowl cross member, a reinforcing bracket in surface contact with and coupled with the cowl cross member flanges, and a cowl cross member mounting bracket coupled at one end with the reinforcing bracket forming a closed space therebetween, the other end of the cowl cross member mounting bracket being connected to a side inner panel and in surface contact therewith.

3 Claims, 4 Drawing Sheets

STRUCTURE OF A COWL CROSS MEMBER MOUNTING UNIT

BACKGROUND OF THE INVENTION

1. Field of the Invention

The present invention relates to a structure of a cowl cross member mounting unit connected with a side inner panel, and more particularly to the structure of a cowl cross member mounting unit for reinforcing the strength of a mounting unit of a cowl cross member and a side inner panel, thereby reducing idle vibration of a steering apparatus and improving the noise vibration harshness (NVH) function of a vehicle.

2. Brief Description of the Related Art

In general, a predetermined shape of a cowl cross flange 2 is, as shown in FIGS. 1 and 2, integrally coupled with both ends of a cowl cross member 1 installed to vertically cross a car body and positioned under a cowl panel. A cowl cross member mounting bracket 3 is coupled at the cowl cross member flange 2. Since the cowl cross member mounting bracket 3 is integrally coupled with a side inner panel (not shown), the cowl cross member 1 has a structure for connection with the side inner panel.

The cowl cross member flange 2 and the cowl cross member mounting bracket 3 are coupled in surface contact with each other and a plurality of through holes 2a, 3a are iprovided for this purpose. A plurality of assembling nuts 4 are welded and connected with the through hole 3a at one side of the cowl cross member mounting bracket 3. In other words, the cowl cross member flange 2 and the cowl cross member mounting bracket 3 are coupled together in surface contact using a plurality of assembling bolts 5 which are inserted through the through holes 2a, 3a and secured with the assembling nuts 4 mounted at the cowl cross member mounting brackets 3. Therefore, the cowl cross member flange 2 and the cowl cross member mounting bracket 3 are coupled together with the assembling bolts 5.

Furthermore, when the cowl cross member mounting bracket 3 is integrally coupled with the side inner panel (not shown), the cowl cross member 1 is connected with the side inner panel through the cowl cross member flange 2 and the cowl cross member mounting bracket 3.

A steering apparatus is installed perpendicularly at the cowl cross member 1, and the idle vibration of the steering apparatus is dispersed to the side inner panel through the cowl cross member 1, the cowl cross member flange 2 and the cowl cross member mounting bracket 3.

However, there are problems in the conventional cowl cross member mounting unit thus constructed in that the cowl cross member flange 2 and the cowl cross member mounting bracket 3 are connected with the side inner panel by direct contact, thereby failing to permit the idle vibration of the steering apparatus to effectively disperse to the side inner panel through the cowl cross member flange 2 and cowl cross member mounting bracket 3, but instead to the driver's seat, causing a deterioration in the driver's riding comfort and the NVH function of the vehicle as a whole.

SUMMARY OF THE INVENTION

It is an object of the present invention to solve the aforementioned problem and provide a structure of a cowl cross member mounting unit of a vehicle to reinforce the strength of a part, where the cowl cross member and side inner panel are interconnected and to disperse the idle vibration of a steering apparatus to the side inner panel to a maximum extent but to the driver's seat to a minimum extent, thereby improving the driver's riding feelings and a NVH function of a vehicle as a whole.

In order to accomplish the aforementioned object of the present invention, there is provided a structure of a cowl cross member mounting unit, the structure comprising:

cowl cross member flanges respectively joining both ends of a cowl cross member;

a reinforcing bracket coupled with the cowl cross member flanges in surface contact therewith; and a cowl cross member mounting bracket coupled at one end with the reinforcing bracket formed a closed space therebetween, the other end of the cowl cross member mounting bracket being connected to a side inner panel in surface contact therewith.

BRIEF DESCRIPTION OF THE DRAWINGS

For fuller understanding of the nature and object of the invention, reference should be made to the following detailed description taken in conjunction with the accompanying drawings in which.

DETAILED DESCRIPTION OF THE INVENTION

Hereinafter, preferred embodiments of the present invention will be described in detail with reference to accompanying drawings.

Figure 3:
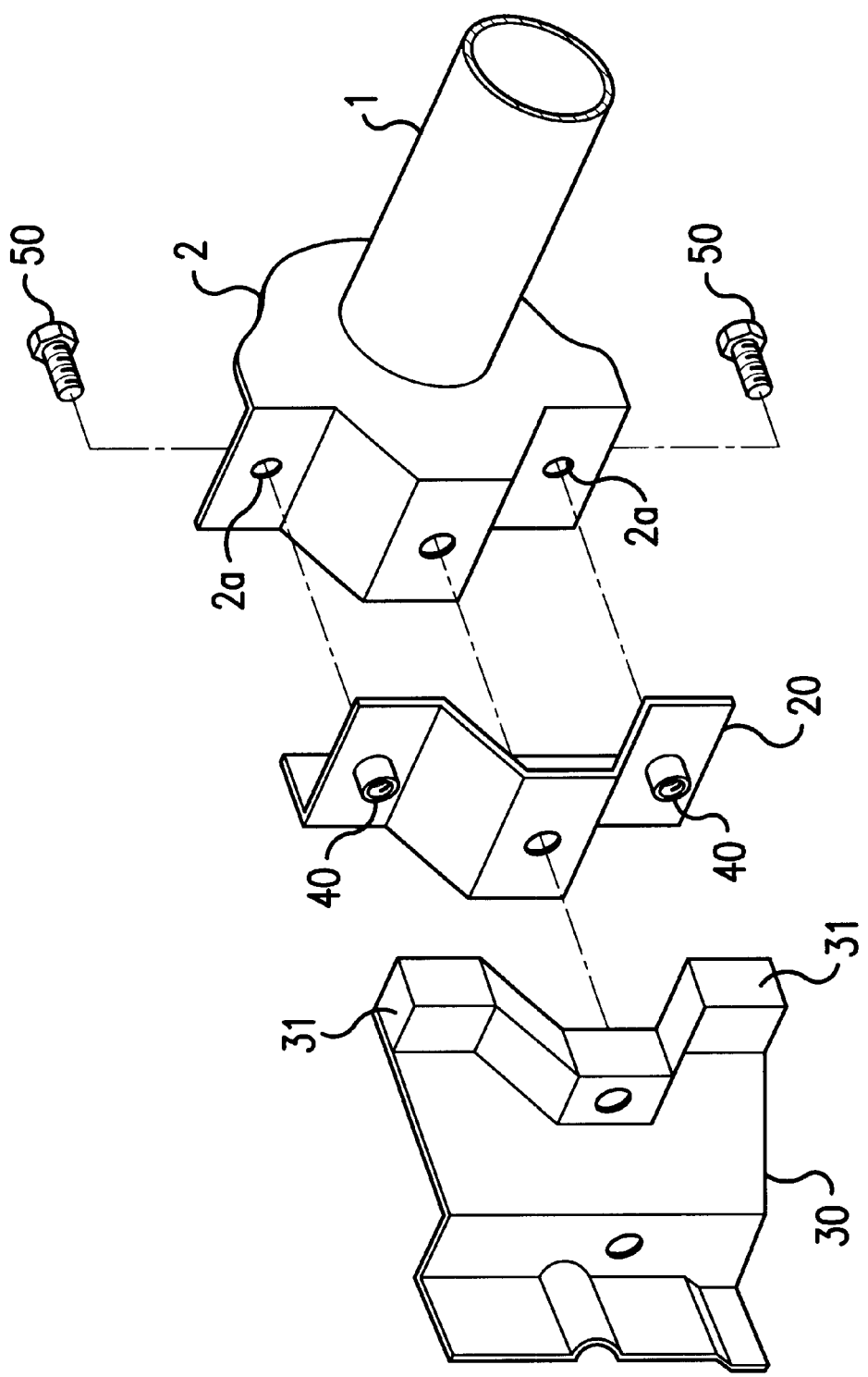
FIGS. 3 and 4 are respectively an exploded perspective view and a cross-sectional view for illustrating a cowl cross mounting unit in accordance with the present invention.
Figure 4:
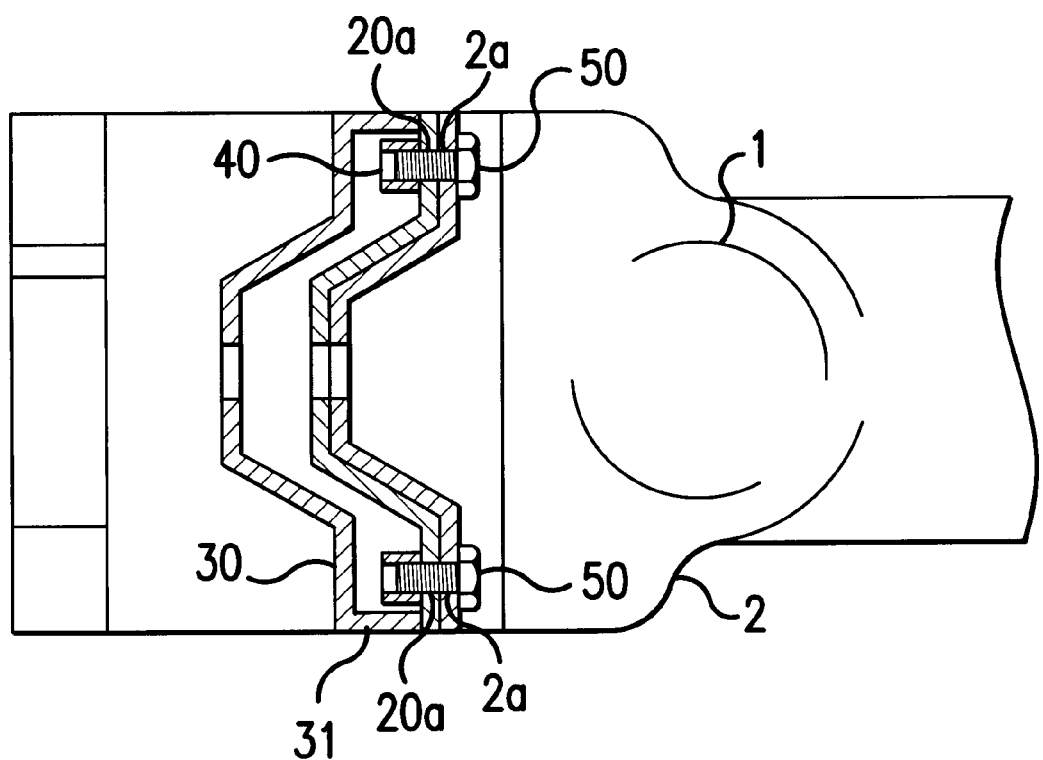

FIGS. 3 and 4 are respectively an exploded perspective view of and a cross-sectional view illustrating a cowl cross mounting unit in accordance with the present invention. According to the present invention, a predetermined shape of a cowl cross flange 2 is, as shown in FIGS. 3 and 4, integrally coupled at both ends of a cowl cross member 1 installed to vertically cross a car body, under a cowl panel. A predetermined shape of a reinforcing bracket 20 is coupled at the cowl cross member flange 2 in surface contact therewith. One end of the cowl cross member mounting bracket 30 is coupled with the reinforcing bracket 20 to form a closed space, and the other end of the cowl cross member mounting bracket 30 is coupled with a side inner panel (not shown), in surface contact therewith.

At this time, the cowl cross member flange 2 and the reinforcing bracket 20 are coupled in surface contact with each other. A plurality of through holes 2a, 20a are formed in the reinforcing bracket 20 and the cowl cross member flange 2, and a plurality of assembling nuts 40 are attached at one side of the reinforcing bracket 20 by welding.

In other words, while the cowl cross member flange 2 and the reinforcing bracket 20 are interconnected in surface contact with each other, a plurality of assembling bolts 50 are sequentially introduced through the through holes 2a, 20a of the cowl cross member flange 2 and the reinforce bracket 20 for coupling with the assembling nuts 40, attached to the reinforce bracket 20. As a result, the cowl cross member flange 2 and the reinforce bracket 20 are sequentially coupled by the assembling bolts 50.

Furthermore, a flange 31 is integrally formed with its ends facing the reinforcing bracket 20 at the peripheral portion of the cowl cross member mounting bracket 30 facing toward one side of the reinforce bracket 20. The flange 31 in integrally coupled with the peripheral portion of the reinforcing bracket 20 for combining the reinforcing bracket 20 and with cowl cross member mounting bracket 30. As a result, a closed space is formed by one side of the reinforcing bracket 20, the cowl cross member mounting bracket 30 and the flange 31.

When the cowl cross member mounting bracket 30 is integrally coupled with the side inner panel (not shown) in surface contact therewith, the cowl cross member 1 is connected with the side inner panel by means of the cowl cross member flange 2, the reinforce bracket 20 and the cowl cross member mounting bracket 30.

In addition, a steering apparatus is perpendicular by connected at the cowl cross member 1, and the idle vibration of the steering apparatus is dispersed to the side inner panel through the cowl cross member 1, the cowl cross member flange 2, the reinforcing bracket 20 and the cowl cross member mounting bracket 30.

Figure 1:
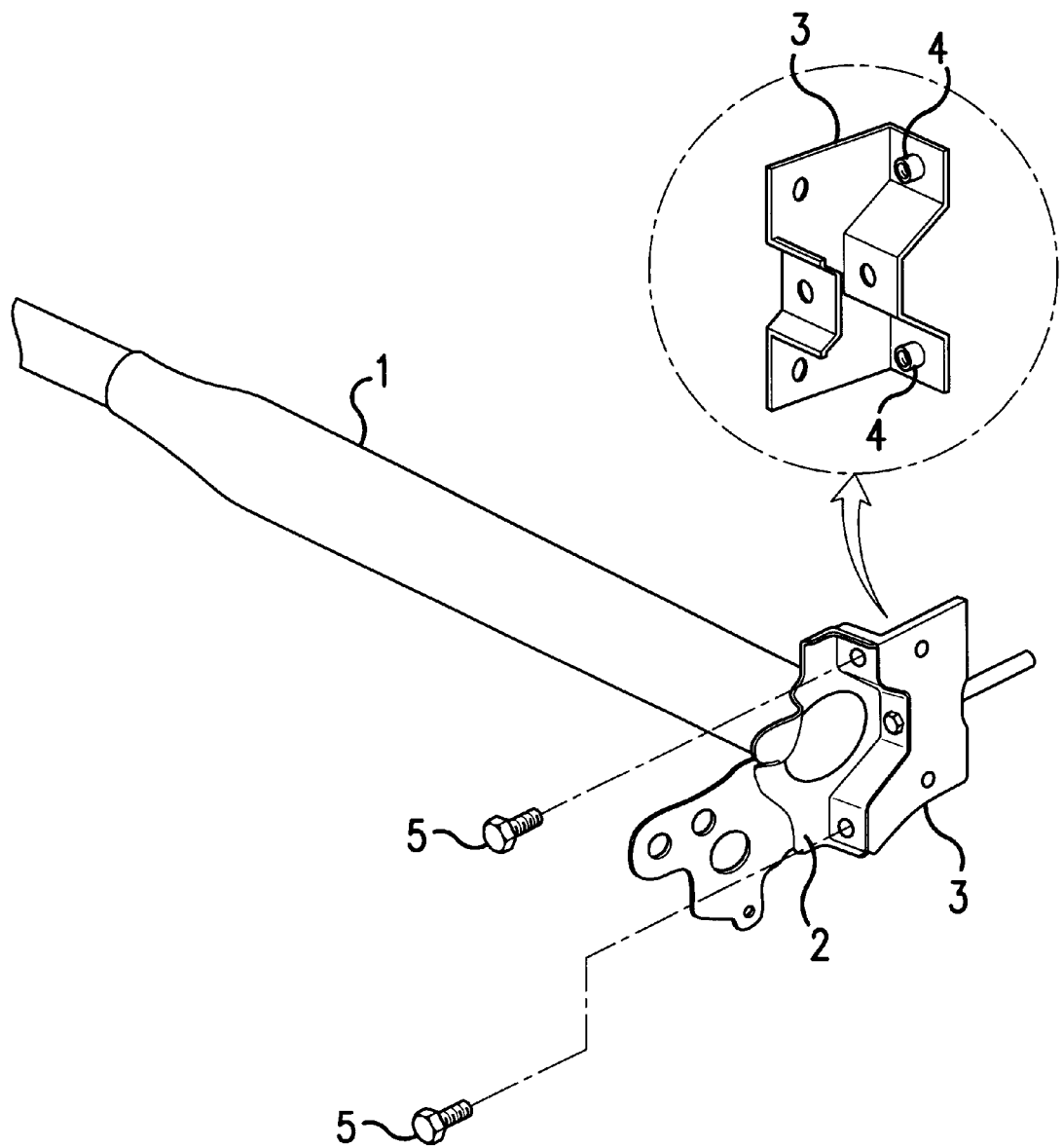
FIGS. 1 and 2 are perspective and sectional views for illustrating a cowl cross member mounting unit in accordance with the prior art.
Figure 2:
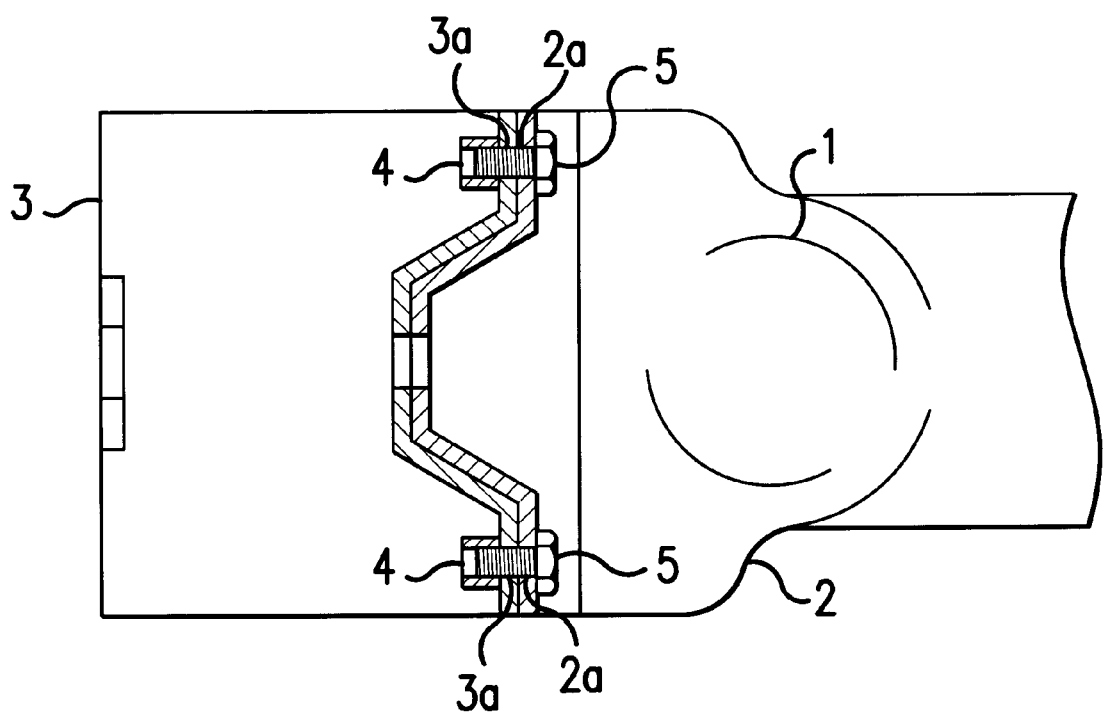

Likewise, the cowl cross member flange 2 attached at both ends of the cowl cross member 1 is coupled with the reinforcing bracket 20 by a plurality of assembling bolts 50 and assembling nuts 40, and the reinforce bracket 20 and the cowl cross member mounting bracket 30 are coupled to each other to form a closed space. The cowl cross member mounting bracket 30 is coupled in surface contact with the side inner panel. In comparison with the conventional structure shown in FIGS. 1 and 2, where the cowl cross member flange 2 is directly coupled with the cowl cross member mounting bracket 3 in surface contact therewith, and the cowl cross member mounting bracket 3 is coupled with the side inner panel, the aforementioned structure of the present invention has the advantage of an increase in the strength of the mounting unit of the cowl cross member 1 by the reinforce bracket 20.

Furthermore, if the strength in the mounting unit of the cowl cross member 1 is increased by the reinforce bracket 20, the idle vibration of the steering apparatus can be effectively dispersed due to the reinforcing bracket 20, whereby the driver's seat is affected to a minimum extent, and the driver's riding feelings and the general NVH function of a vehicle is improved.

As described above, there are advantages in the structure of the cowl cross member mounting unit of the present invention in that the strength of the mounting unit at both ends of the cowl cross member is increased by the reinforce bracket coupled between the cowl cross member flange and the cowl cross member mounting bracket and that the idle vibration of the steering apparatus effectively disperses owing to the reinforce bracket, thereby improving the driver's driving feelings and the NVH function of an entire car, which will ultimately lead to a progress in consumer preference and product value.

What is claimed is:

1. A cowl cross member mounting unit comprises:

a cowl cross member flange respectively joining both ends of a cowl cross member;

a reinforcing bracket in surface contact with and coupled with the cowl cross member flanges; and a cowl cross member mounting bracket coupled at one end with the reinforcing bracket forming a closed space therebetween, the other end of the cowl cross member mounting bracket being connected to a side inner panel and in surface contact therewith.

2. The structure, as defined in claim 1, wherein a plurality of assembling nuts are attached to one side of the reinforcing bracket facing the cowl cross member mounting bracket, and the cowl cross member flange and the reinforcing bracket are coupled together by assembling bolts which extend through the cowl cross member flange and the reinforcing bracket and are coupled to the assembling nuts.

3. The structure, as defined in claim 1, wherein a flange of the cowl cross member mounting bracket is integrally attached at the periphery to one side of the reinforcing bracket to enable the reinforcing bracket and cowl cross member mounting bracket to define said closed space.

* * * * *